United States Patent Office 3,258,957
Patented July 5, 1966

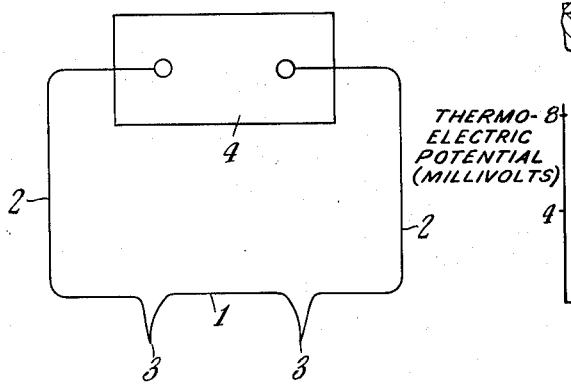
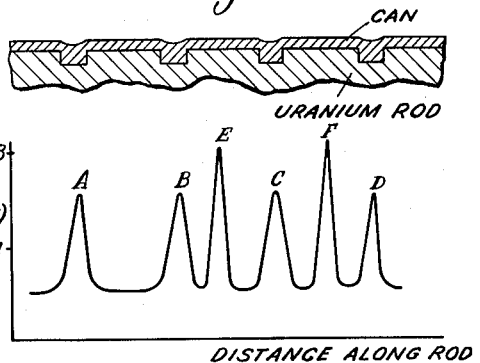
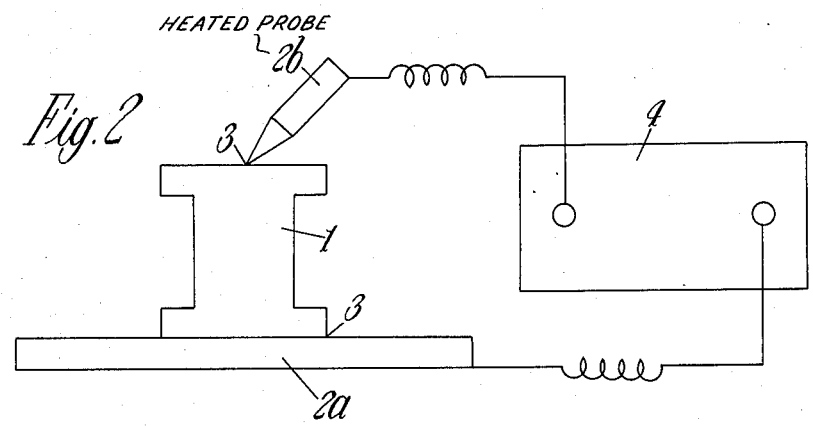
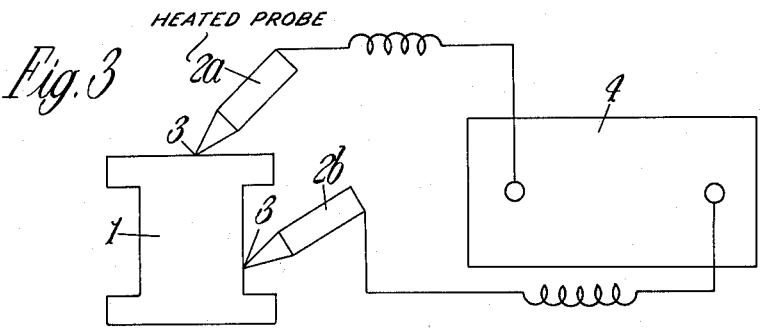

3,258,957
NON-DESTRUCTIVE TESTING OF MATERIALS
Desmond Smart, Newcastle-upon-Tyne, England, assignor to C. A. Parsons & Company Limited, Newcastle-upon-Tyne, England
Filed Jan. 21, 1963, Ser. No. 252,813
Claims priority, application Great Britain, Jan. 25, 1962, 2,796/62
1 Claim. (Cl. 73—15)

This invention relates to a method and apparatus for non-destructive testing of metallic materials.

When a material subjected to mechanical stress or strain or for instance as referred to below is strained, changes in internal energy occur in the material. Similarly the presence of voids such as cracks, or blowholes alters the internal energy of the material.

The object of the present invention is to provide a method and apparatus for the non-destructive testing of materials which makes use of their internal energy changes as a means of measuring or indicating the presence of strain in a material or the presence of voids or other factors producing the energy changes.

The invention consists in a method of non-destructive testing of materials which method comprises measuring or indicating changes in the thermo-electric properties of the material as a measure or indication of internal energy changes in the material.

The invention also consists in apparatus for carrying out the method of the preceding paragraph comprising at least two contacts for positioning on the surface of a specimen under test, the contacts being maintained at different temperatures, and means for either or both measuring absolutely or indicating changes in, the thermo-electric potential between the contacts.

The invention also consists in apparatus in accordance with the preceding paragraph in which one contact is in the form of a probe.

The invention also consists in apparatus in accordance with either of the preceding two paragraphs in which for two contacts between which thermo-electric potential is being measured the contact which is in the form of a probe is maintained at a higher temperature than the other contact.

The invention also consists in apparatus in accordance with the first of the preceding two paragraphs in which for two contacts between which thermo-electric potential is being measured, the other contact is also in the form of a probe.

The invention also consists in apparatus in accordance with the first of the preceding three paragraphs in which the other contact or contacts is in the form of a block of material on which the specimen rests.

The invention also consists in apparatus in accordance with any of the preceding four paragraphs in which, when the contacts are of the same material as the specimen, they are annealed before use.

The invention also consists in apparatus in accordance with the first of the preceding five paragraphs in which the contacts are in the form of a liquid.

The invention also consists in a method and in apparatus substantially as described herein with reference to the accompanying diagrammatic drawings in which:

FIGURE 1 shows in block form basic apparatus for carrying out a method according to the invention, FIGURE 2 shows apparatus in accordance with one embodiment of the invention, FIGURE 3 shows apparatus in accordance with an alternative embodiment of the invention, and FIG. 4 is a fragmentary, cross-sectional view of a test specimen and FIG. 5 is a scale illustrating the result of a test operation.

In carrying the invention into effect as illustrated by way of example and referring to FIGURE 1 the basic apparatus consists of a specimen under test which forms part 1 of an electrical circuit 2 with contacts forming junctions 3 with the specimen, and a device 4 such as a potentiometer for recording thermo-electric potential across the specimen. The junctions 3 are maintained at different temperatures and the material of the contacts and the specimen are of different material to produce a thermo-electrical potential. In some circumstances the potential can be produced by making the contacts of the same material as the strained specimen provided the contacts are fully annealed to relieve them of any strain.

Any strain in the specimen produces changes in internal energy in the specimen because of the free surfaces so produced which energy change alters the thermo-electric potential between the contacts and it has been found that a relationship exists between the changes in thermo-electric potential and the changes in internal energy and these can be used to detect or measure absolutely the strain existing in the specimen. Changes in internal energy are produced by strains induced by heating, bending, torsion, tension or compression of the material, as a result of mechanical, electrical or heat treating processes. They can also be produced by changes in the structure of the material due to the introduction or precipitation of alloying components or impurities in any chemical or physical processes such as erosion, corrosion, fatigue, work hardening, age hardening, etc. The formation of voids due to cracks or blowholes or, for example slag inclusions in castings would also produce changes in internal energy and hence in thermo-electric potential so that the method can be used to detect and or measure the presence of any of these effects in the specimen.

FIGURE 2 shows a practical form of apparatus for putting the invention into effect. A specimen 1 rests on a plate 2a which constitutes one of two contacts. The other contact is formed by a probe 2b. The probe 2b is heated for example by electrical means or by vapour heating and the plate 2a acts as a heat sink. The junctions 3 are formed between the probe 2b and surface of the specimen on the one hand and by the specimen on the plate 2a on the other.

With the arrangement shown in FIGURE 2 it is possible to detect strains or changes in internal energy due to other effects in the immediate region of the probe 2b.

One example of the use of the thermoelectric technique for the non-destructive testing of metals is illustrated in FIGS. 4 and 5. These figures illustrate the testing of a magnesium alloy can used to contain uranium rods that are used as fuel elements in nuclear reactors.

In a typical uranium rod clad with magnesium alloy of about 0.080" thickness, a number of anti-ratchetting grooves $\frac{1}{8}$" wide and $\frac{3}{32}$" deep are machined onto the periphery of the rod normal to its major axis as shown in FIGURE 4. When the can is sealed, it is pressurized onto the rod hydraulically and a certain amount of the cladding material is forced into these anti-ratchetting grooves on the uranium rod. A considerable amount of cold work occurs in this process and the resulting difference in the thermoelectric properties of the material can be demonstrated by placing the can as shown at 1, FIG. 2, on a sheet 2a of copper and using as the other electrode, a probe 2b in the form of a pointed copper rod which is heated to 100° C. by means not shown. The output from this thermocouple is usually a few millivolts as shown in FIGURE 5 and large increases in the thermo-electric potential occur at points A, B, C and D, as the probe 2b is moved from a piece of normal can onto a region which has been deformed onto the anti-ratchetting grooves. A plot of thermoelectric potential against distance along the can measured from one end shows one of these "peaks" at each of the anti-ratchetting grooves. In the particular can under test, two other "peaks" E and F were observed which exceeded the height of the "peaks" A, B, C and D associated with the normal positions of the anti-ratchetting grooves.

After an extremely careful examination of the can with a microscope, two minute surface flaws were discovered at locations which corresponded exactly with the position of these "peaks" E and F. On sectioning of the can in these areas, one was found to be a crack in the can which had probably occurred after pressurization, and the other was found to be an inclusion of some black material which was too small to be identified analytically. These observations demonstrated the technique as a manner of assessing the amount of cold work which had occurred in a pressurizing operation and also identified two flaws in the can which were almost certain to have escaped the most careful visual examination without any magnifying aids.

The alternative embodiment arrangement of FIGURE 3 makes it possible to investigate strains in the path which an electric current would take between the junctions 3 between the contacts and the specimen. In this arrangement both contacts are in the form of probes 2a, 2b and one is heated so as to raise its temperature above that of the other. Any strain in the plane passing through the two junctions 3 will produce changes in the thermoelectric potential. The probes can be placed in any position on the surface of the material and could for example be on the same surface. By moving the probes around the specimen it is possible to detect changes of internal energy in any desired portion of the specimen.

The thermo-electric voltage developed across the potentiometer could be recorded.

Whilst the apparatus illustrated in FIGURES 1, 2 or 3 show two contacts more than two can be used if desired.

As mentioned above the method and apparatus can be applied to either or both the detection and measurement of selections or combinations of the three principal modes of strain i.e. compression, tension and torsion but it can also be used to detect blowholes or slag inclusions in castings or voids in the material such as can be produced by cracks; in fact to any change in internal energy due to any physical or chemical or other process.

The technique is quick and simple and there is no restriction on the size of the specimen or portion of specimen to be tested.

Instead of solid contacts, liquid contacts may be used. For example in testing wires it may be more convenient to dip the ends of the wire in liquids constituting the contacts. In a further embodiment one contact may be liquid and the other solid.

The contacts may be of electrically conducting material either liquid or solid or they may be of semi-conducting material, liquid or solid.

I claim:

A method of non-destructive testing of metallic materials to detect the presence and location of regions of altered internal energy, due for example to strains, voids or similar localized effects, comprising the steps of:

(a) bringing into contact with spaced-apart regions of the material under test, respective contact pieces formed of different metals from said material under test, to form at least two junctions of dissimilar metals, (b) producing a temperature difference between said junctions, and (c) sensing the thermoelectric potential thereby produced between said junctions, while (d) moving at least one of said contact pieces to different regions of said material under test, to reveal, by the corresponding changes in said potential, the presence and location of regions of altered internal energy in the material under test.

References Cited by the Examiner

UNITED STATES PATENTS

| | | | |
|---|---|---|---|
| 764,176 | 7/1904 | Bristol | 136—4 X |
| 1,680,589 | 8/1928 | Bock | 73—15.6 |
| 2,363,181 | 11/1944 | Howland | 73—88.5 |
| 2,494,244 | 1/1950 | Jonard et al. | 73—136 |
| 2,621,276 | 12/1952 | Howland | 73—88.5 X |
| 2,972,882 | 2/1961 | Erwin et al. | 73—15 |
| 3,016,732 | 1/1962 | Hanysz et al. | 73—15 |
| 3,063,458 | 5/1962 | Vali | 73—88.5 |

RICHARD C. QUEISSER, *Primary Examiner.*

D. B. DEIOMA, *Assistant Examiner.*